(12) United States Patent
Yochai et al.

(10) Patent No.: US 7,577,787 B1
(45) Date of Patent: Aug. 18, 2009

(54) METHODS AND SYSTEMS FOR SCHEDULING WRITE DESTAGES BASED ON A TARGET

(75) Inventors: Yechiel Yochai, Lincoln, RI (US); Peng Yin, South Grafton, MA (US); Rong Yu, Franklin, MA (US); Bing Liu, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 416 days.

(21) Appl. No.: 11/611,219

(22) Filed: Dec. 15, 2006

(51) Int. Cl.
*G06F 12/00* (2006.01)
(52) U.S. Cl. ...................................... 711/113
(58) Field of Classification Search ........................ None
See application file for complete search history.

(56) References Cited

U.S. PATENT DOCUMENTS 6,141,731 A * 10/2000 Beardsley et al. ........... 711/136
6,189,080 B1 * 2/2001 Ofer ........................... 711/167
6,904,470 B1 6/2005 Ofer et al.
2007/0220201 A1 * 9/2007 Gill et al. ..................... 711/113

OTHER PUBLICATIONS

U.S. Appl. No. 11/154,234, entitled "Physical Based Scheduler," filed Jun. 16, 2005.

* cited by examiner

*Primary Examiner*—Brian R Peugh
(74) *Attorney, Agent, or Firm*—Muirhead and Saturnelli, LLC (57) ABSTRACT

Methods and systems are disclosed that relate to scheduling the processing of I/O requests in a cache for a plurality of logical devices associated with the cache. An exemplary method includes identifying a minimum target number of write destages to be performed with respect to a logical device per unit time. In identifying the minimum target number, factors such as a write pending count and an average queue length of writes pending may be considered. The method further includes enforcing the target minimum number of write destages. A disclosed method of enforcing the target includes tracking the number of write destages performed on the logical device and increasing a priority for a write request to the logical device when the minimum target number of write destages is not met.

20 Claims, 9 Drawing Sheets

Priority Lookup Table 351

| Write Priority | Write Pending Level |
|---|---|
| 1 | 0 |
| 2 | 1 |
| 3 | 2 |
| 4 | 5 |
| 5 | 10 |
| 6 | 20 |
| 7 | 30 |
| 8 | 40 |
| 9 | 60 |
| 10 | 80 |
| 11 | 120 |
| 12 | 160 |
| 13 | 240 |
| 14 | 320 |
| 15 | 480 |
| 16 | 640 |

METHODS AND SYSTEMS FOR SCHEDULING WRITE DESTAGES BASED ON A TARGET

FIELD OF INVENTION

The present invention relates generally the scheduling of I/O tasks directed to logical devices in data storage systems that have cache, and relates particularly to scheduling the processing of a write I/O request in the cache.

BACKGROUND

The scheduling of jobs, such as write destaging, read requests, and load balancing in a data storage system has an effect on the performance of the data storage system as a whole. The performance of the data storage system, in turn, affects the performance of applications running on host systems using the data in the data storage system. Optimizing the scheduling of jobs in a data storage system may improve the response time to I/O from applications that are using the system.

Many hosts may use the same data storage system, and data storage systems can be made up of a number of physical memory devices, such as hard disk drives also known as spindles. Typically, a host does not address a physical memory device in a data storage system directly, but instead addresses a logical unit. A logical unit associated with a data storage system may be made up of one or more spindles or portions thereof, which are within the data storage system. The data storage system manages I/O requests from the hosts by mapping requests directed to logical units from the hosts to the appropriate physical memory devices. The data storage system also schedules and processes the I/O requests from the host. An example of a data storage system having the foregoing basic architecture is the SYMMETRIX data storage system available from EMC Corporation of Hopkinton, Mass.

In the data storage system, there is typically a plurality of physical, persistent memory devices, or spindles. Each spindle may be partitioned into logical devices. A disk adapter (DA), which is the interface between the cache and one or more spindles, may schedule jobs for the associated spindles. A scheduling algorithm in the DA may determine when any job will be performed, including system maintenance jobs such as load-balancing, or read and write requests from hosts using the data storage system.

Typically, a write request from the host is first stored in the cache memory of the data storage system. A write request is destaged when data is moved from the cache and written to the appropriate logical device. The job scheduler in the DA controls when this destage will occur, how many write requests will be destaged at a time, and which write requests to perform. Prior art algorithms for job scheduling typically assign read requests higher priority than write requests and schedule the destage of write requests from the cache when a threshold number of writes pending in the cache for a logical device has been reached. One such algorithm for job scheduling is described in U.S. Pat. No. 6,904,470, which issued on Jun. 7, 2005 to Adi Ofer et al. Another type of prior art algorithm for scheduling the destage of write requests allocates a percentage of the operation time that the DA should allocate to destaging write requests.

SUMMARY OF EXEMPLARY EMBODIMENTS

Methods and systems are disclosed that relate to scheduling the processing of I/O requests in a cache for a plurality of logical devices associated with the cache. An exemplary method consistent with the principles of the invention includes identifying a target minimum number of write destages to be performed with respect to a first logical device in the plurality of logical devices within a unit of time. The exemplary method further includes enforcing the target minimum number of write destages to be performed with respect to the first logical device.

Another exemplary method consistent with the principles of the invention includes identifying a first target time between processing a first write request in the cache associated with a first logical device in the plurality of logical devices and processing a second write request in the cache associated with the first logical device. The exemplary method further includes tracking an elapsed time since processing the first write request, wherein processing the first write request comprises writing data to the first logical device. The exemplary method further includes comparing the elapsed time to the first target time and increasing a priority associated with the second write request when the elapsed time is equal to the first target time, wherein the increased priority causes the second write request to be processed promptly.

Another exemplary method consistent with the principles of the invention includes identifying a target minimum number of write destages to be performed with respect to a first logical device in the plurality of logical devices within a unit time. The exemplary method further includes tracking a number of write destages performed with respect to the first logical device within the unit of time. The exemplary method further includes comparing the number of write destages performed within the unit of time to the target minimum number and increasing a priority associated with a write destage to be performed with respect to the first logical device when the number of write destages performed within the unit of time is less than the target minimum per unit time.

One of ordinary skill in the art will appreciate that the methods described herein may be embodied in various components of a data storage system. Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 2b illustrates in more detail an exemplary spindle from FIG. 2a;

FIG. 3 illustrates in more detail an exemplary disk adapter from FIG. 2a;

DETAILED DESCRIPTION

The inventors of the present invention recognized that some of the current challenges to optimum scheduling of the destaging of write requests from cache memory—such as having more devices per spindle, the use of a message bus, the desire for parity RAID protection, and/or the desire for write pending fairness—may be new. The inventors recognized that a new algorithm for scheduling of the destaging of write requests from cache memory may result in unexpected improvement in I/O request response times. The inventors recognized that an algorithm for scheduling the destaging of write requests based on a minimum target number of write destages per unit of time based on the system conditions may reduce the host I/O response time. The inventors also recognized that such an algorithm may increase the predictability of the host I/O response time. For example, the inventors recognized that a method for enforcing a target minimum number of write destages from cache per unit of time may guarantee a given level of performance while restricting the impact on the host read response time when there are sequential writes requests pending.

Reference is now made in detail to exemplary embodiments of the invention, examples of which are illustrated in the accompanying drawings.

Figure 1:
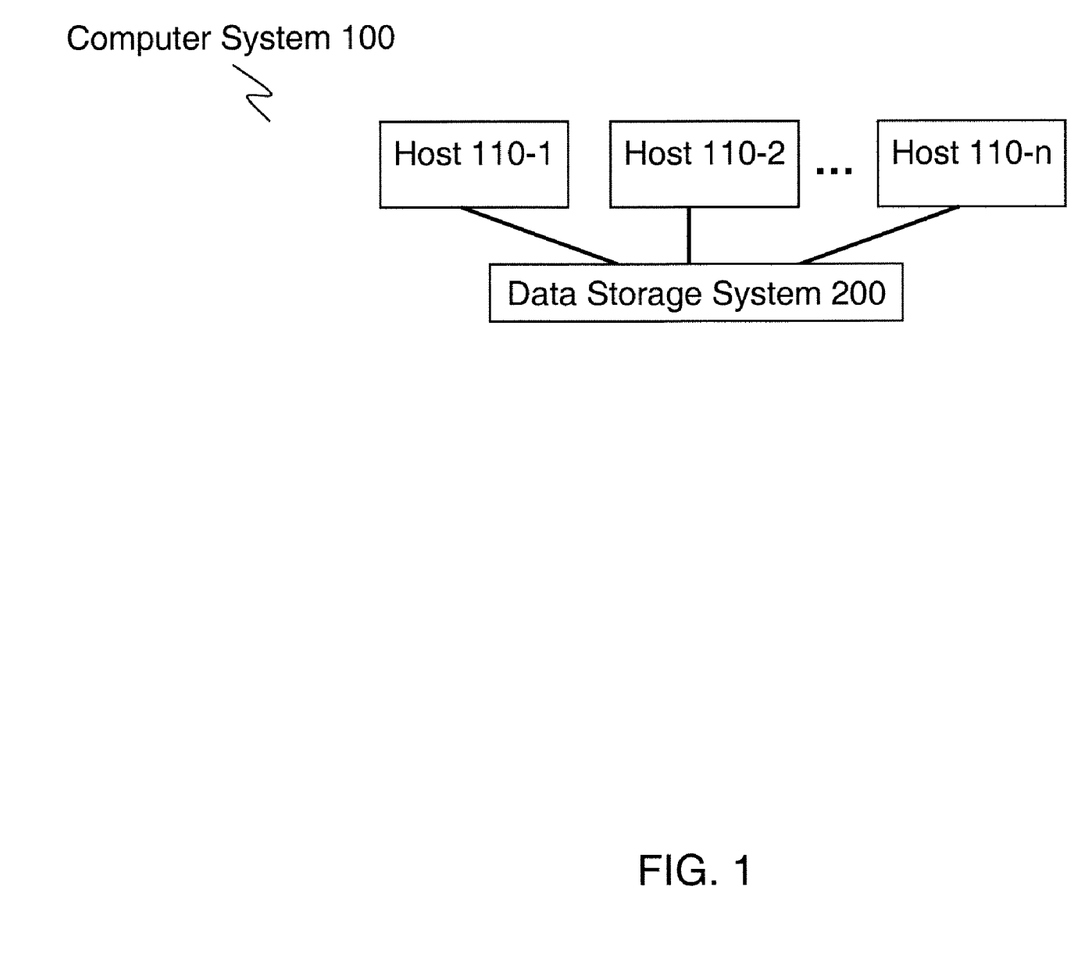
FIG. 1 illustrates an exemplary computer system in which the invention can be employed.

As shown in FIG. 1, hosts 110-1 to 110-*n* may access data in data storage system 200 of computer system 100. A host 110 can be, for example, a server, a personal computer, or any other device capable of initiating read and write requests to data storage system 200. Data storage system 200 can be, for example, a SYMMETRIX data storage system.

Figure 2A:
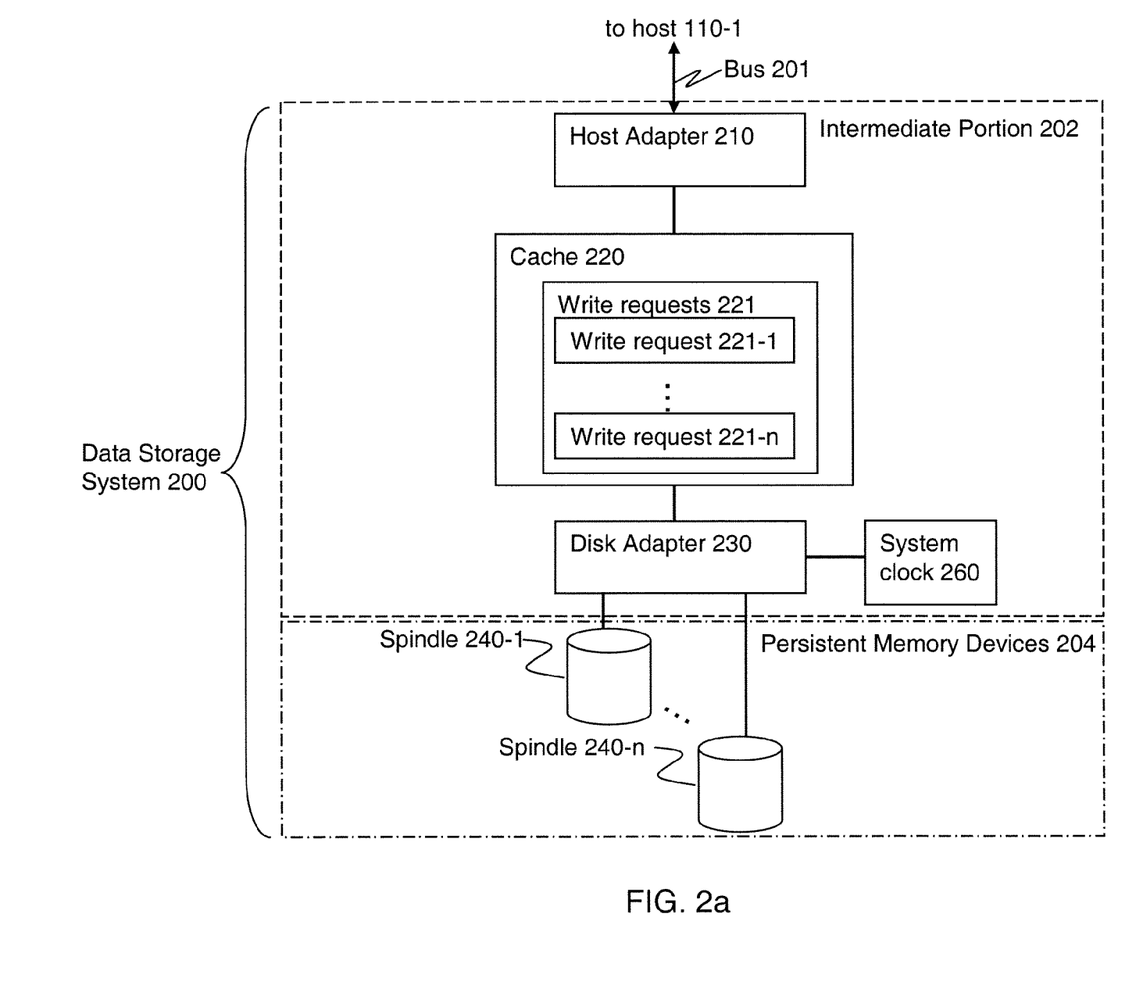
FIG. 2a illustrates an exemplary storage system consistent with the features and principles of the present invention.
Figure 2B:
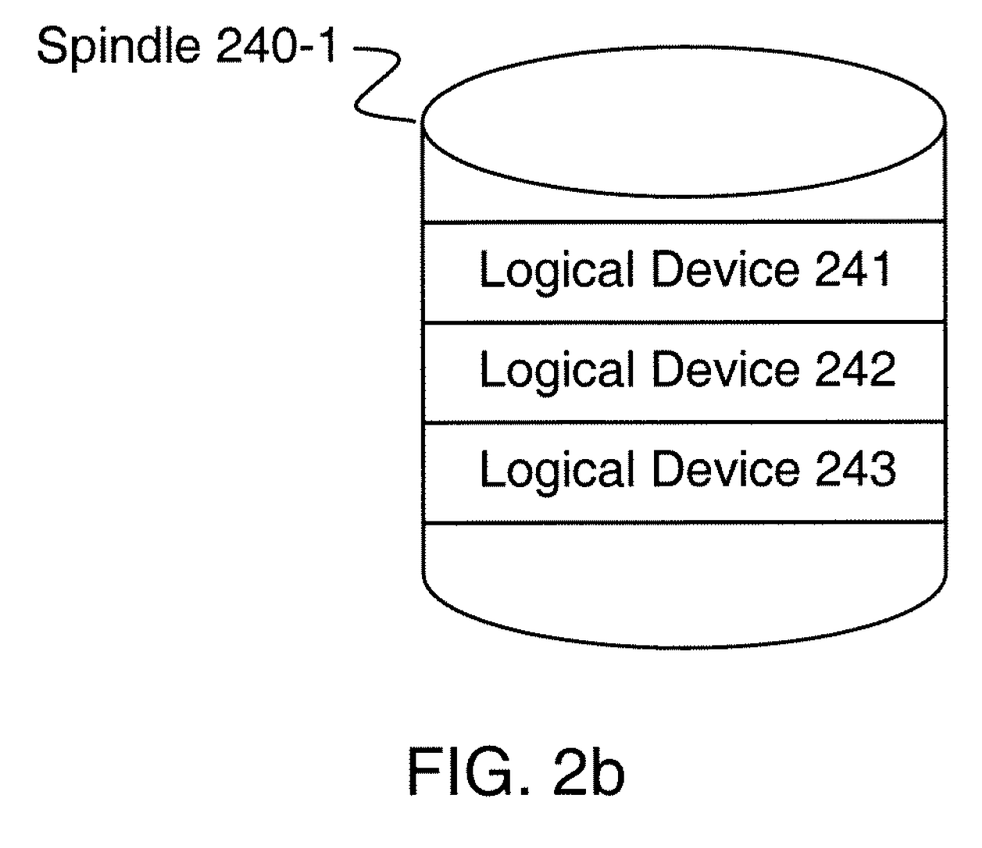

FIG. 2*a* shows exemplary data storage system 200 in further detail. Data storage system 200 includes a plurality of persistent memory devices, spindles 240-1 to 240-*n*. Spindles 240-1 to 240-*n* may be divided into partitions. Although striping and other memory configurations are within the scope of the invention, each partition corresponds to a "logical device" in the exemplary embodiments. FIG. 2*b* shows spindle 240-1 divided into logical devices 241, 242, and 243.

Data storage system 200 of FIG. 2*a* also includes an intermediate portion 202 that facilitates communication between host 110-1 and the logical devices on spindles 240-1 to 240-*n*. Intermediate portion 202 performs both front-end and back-end operations for the data storage system. For example, intermediate portion 202 receives write requests and read requests from host 110-1 and processes these requests as necessary to read data from and write data to logical devices on spindles 240-1 to 240-*n*. Additionally, intermediate portion 202 performs operations such as load balancing and data copying. Bus 201, which connects host 110-1 to intermediate portion 202, can be operated in accordance with any one of a number of bus protocols including Fibre Channel, SCSI, and Serial ATA.

For simplicity, FIG. 2*a* shows exemplary intermediate portion 202 having one host adapter 210 and one disk adapter 230. Host adapter 210 controls communication between host 110-1 and cache 220. Disk adapter 230 controls communication between cache 220 and spindles 240-1 to 240-*n*. Nonetheless, data storage systems consistent with the principles of the invention may have multiple host adapters and/or multiple disk adapters. Typically, a disk adapter is dedicated to and associated with one or more spindles. The disk adaptors and spindles may be configured in such a way to support redundancy so that the spindles may include both primary and secondary storage. Disk adaptors also handle the data storage system's back-end operations such as data copying and services to maintain a specific RAID configuration. Host adapter 210 can communicate with disk adapter 230 through cache 220 or by another messaging scheme.

Intermediate portion 202 enables data storage system 200 to operate efficiently in servicing host requests. When host 110-1, communicating via bus 201 and host adapter 210, requests that data stored in logical devices on persistent memory devices 204 be read, storage system 200 may service the read request from cache 220 rather than from one or more of the persistent memory devices 204 to execute the read more efficiently. Accordingly, cache 220 typically includes data read from the persistent memory devices 204. Similarly, when host computer 110-1 requests that data be written to a logical device, that write request is first stored in cache 220. Accordingly, cache 220 typically includes a plurality of write requests 221-1, . . . , 221-*n*. Disk adapter 230 can destage write request 221-1 and other write requests 221 stored in cache 220 to the appropriate logical devices on one or more spindles in a manner transparent to host computer 110-1.

A spindle typically has a queue that is limited to a maximum number write I/O requests that can be pending at one time. A write request may be lost when it is destaged to a spindle with a full queue since once a write request is destaged, it generally cannot be sent back to the cache. Therefore, when destaging write requests 221 to the logical devices on persistent memory devices 204, disk adapter 230 should consider the number of write requests in the spindle's queue.

A write request, such as write request 221-1, includes all information necessary for data storage system 200 to write data to one or more of the persistent memory devices 204. When the write request is processed, no further communication to the host is typically necessary. The write request includes the actual data to be written to a spindle as well as a spindle identifier and destination memory address on the spindle. The destaging of write requests is based on a scheduling algorithm designed to optimize the performance of data storage system 200. Disk adapter 230 uses system clock 260 as part of its scheduling algorithm, which will be discussed in further detail later.

Figure 3:
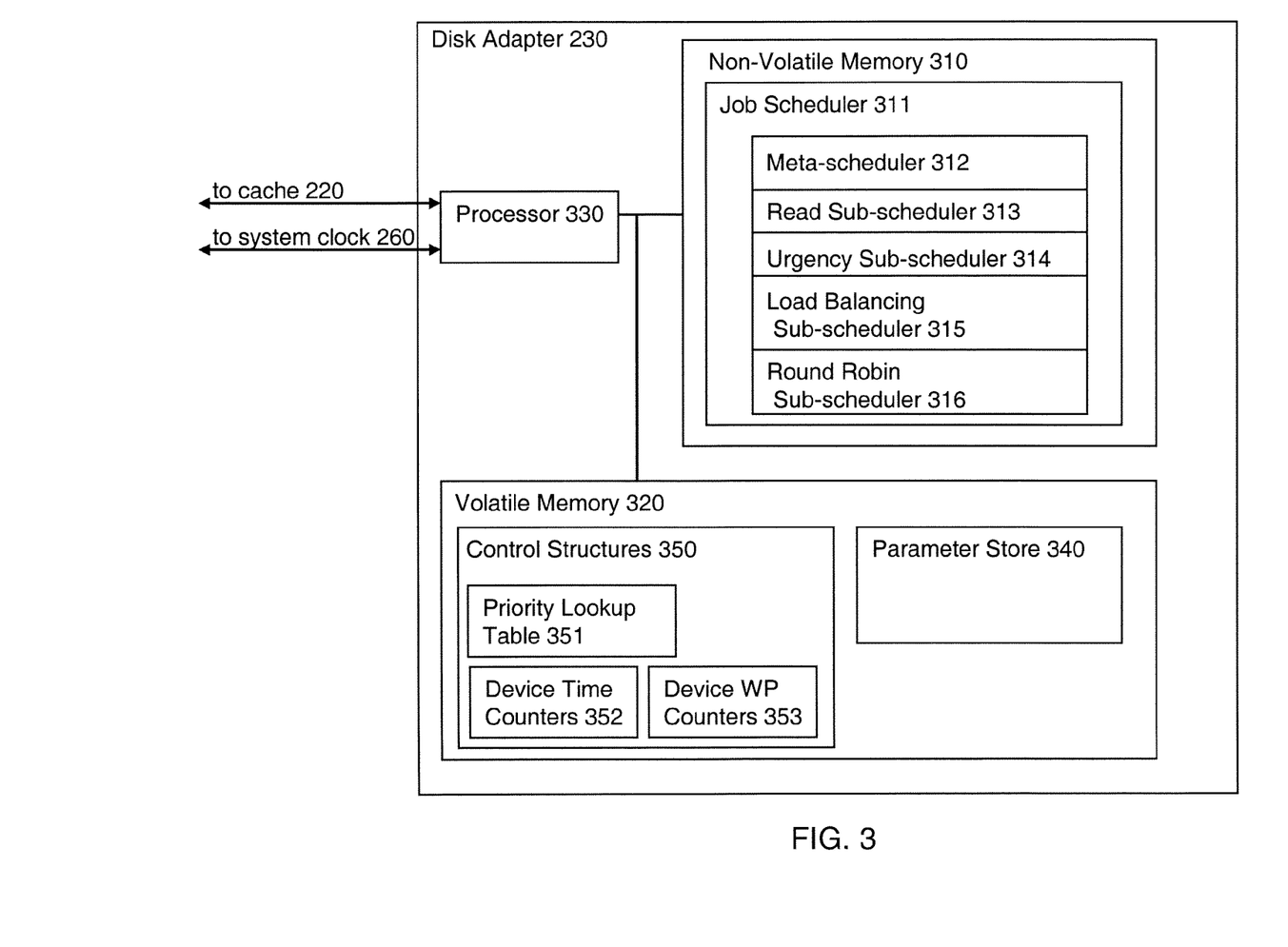

FIG. 3 shows disk adapter 230 in some detail. Disk adapter 230 includes at least one processor 330 coupled to non-volatile memory 310 and volatile memory 320. Processor 330 controls the operations of disk adapter 230 and communications with memories 310 and 320. In the exemplary disk adapter 230, non-volatile memory 310 includes a job scheduler 311. Job scheduler 311 employs a main scheduler (meta-scheduler 312) and at least one sub-scheduler. Exemplary sub-schedulers include a read sub-scheduler 313, an urgency sub-scheduler 314, a load balancing sub-scheduler 315, and a round robin sub-scheduler 316. Meta-scheduler 312 decides, for example, which, if any, sub-scheduler to run based on various criteria such as priority and urgency. A method for the selection of sub-schedulers and exemplary operations of sub-schedulers are disclosed in U.S. Pat. No. 6,904,470 issued to Ofer et al.

Figure 6:
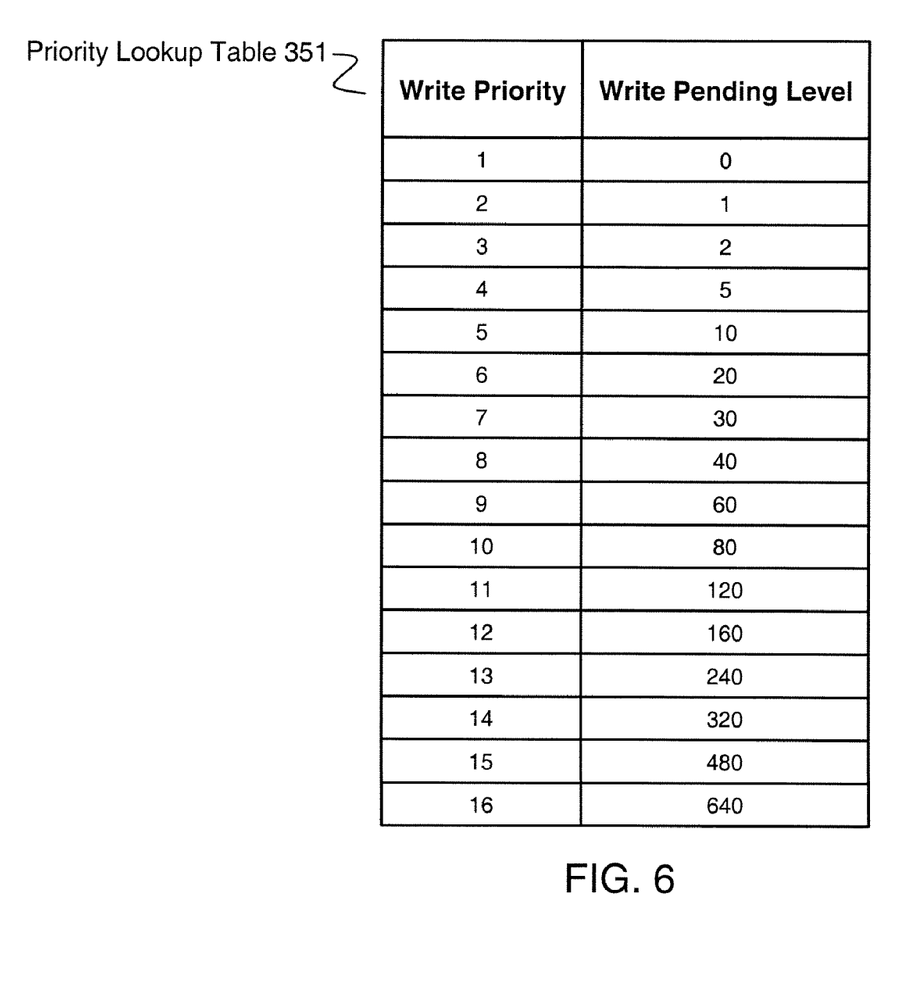
FIG. 6 illustrates an exemplary lookup table for determining the write priority for a write request in cache.

In disk adapter 230, volatile memory 320 includes a parameter store 340. Parameter store 340 includes parameters used by job scheduler 311, such as a maximum number of system write requests that may be pending ("maximum system writes pending") and a maximum number of device write requests that may be pending ("maximum device writes pending"). The maximum system writes pending is a value that determines the maximum percentage of slots or the maximum number of write requests 221, in cache 220, that are allowed at any given time. Similarly, the maximum device write pending is a value that determines the maximum percentage of slots or maximum number of write requests 221, in cache 220, that may be directed to a single logical device on a spindle that are allowed at any given time. Other parameters that may be stored in parameter store 340 include a maximum spindle writes pending representing the maximum number of write requests 221 that may be directed to a single spindle. Volatile memory 320 also contains control structures 350 used by job scheduler 311 including device time counters 352, device write pending counters 353 and priority lookup table 351, which is shown in further detail in FIG. 6. The use of the parameters and control structures by job scheduler 311 will be described in detail later.

Figure 4:
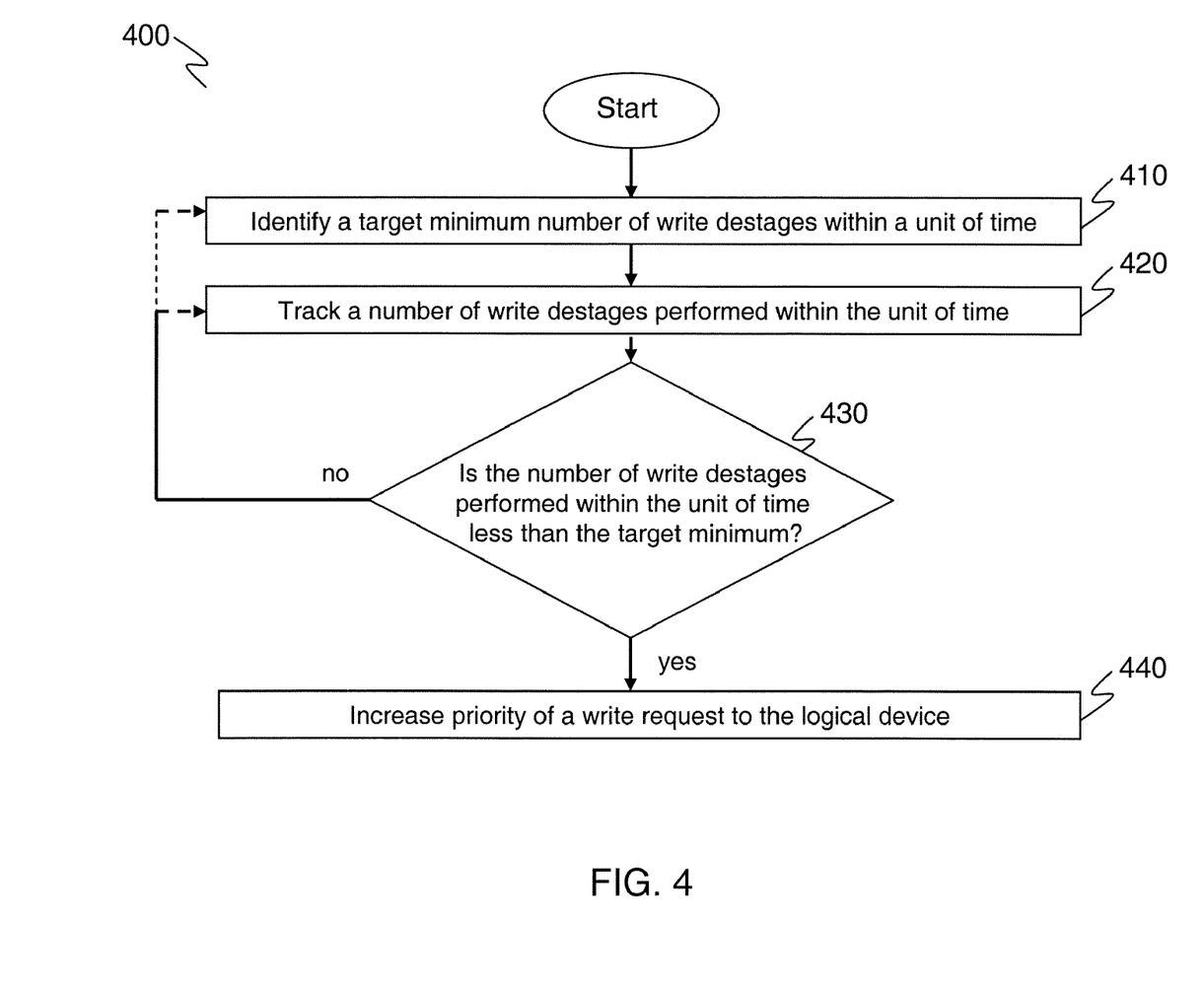
FIG. 4 illustrates an exemplary method for scheduling the processing of I/O requests in a cache for a plurality of logical devices associated with the cache.

FIG. 4 illustrated exemplary method 400 for scheduling the processing of I/O requests in a cache for a plurality of logical devices associated with the cache using a target minimum number of write destages to be performed with respect to a logical device within a unit of time. Method 400 may be implemented, for example, by disk adapter 230 to schedule a plurality of write requests in cache 220 directed to any logical device on any spindle 240-1 to 240-n. The exemplary methods described herein may be performed by a sub-scheduler, such as the urgency sub-scheduler 314, by the meta-scheduler 312, or by some other scheduler. One of ordinary skill in the art will appreciate that method 400 may be performed by a single scheduler or by a plurality of schedulers in a variety of configurations.

In the exemplary data storage system 200, exemplary disk adaptor 230 implements exemplary method 400 in urgency sub-scheduler 314 to schedule the destaging of write requests 221 in cache 220 directed to logical device 241. In stage 410 of method 400, urgency sub-scheduler 314 identifies a target minimum number of write destages to be performed with respect to a logical device within a unit of time.

Method 400 may return to stage 410 at a fixed interval determined by a counter or clock. Alternatively, method 400 may return to stage 410 in response to a trigger, such as a performance metric, a change in the data storage system 200, or a round-robin scheduler for each of the logical devices or for each spindle associated with cache 220.

In stage 410, the scheduler may call a function or multiple functions to calculate the target number of write destages. Where stage 410 is performed periodically, the function that calculates the target number of write destages may be the same each time it is called or the scheduler may choose from a plurality of functions. Such a scheme may be desirable to minimize calculations and to maximize the efficiency of the job scheduler's algorithms. For example, there may be a "static function" that is performed less often and a "dynamic function" or "adjustment function" that is performed more frequently.

One way to enforce the target minimum number of write destages is to compare the number of write destages that have been performed with respect to the logical device in a given time interval to the target minimum number. If fewer than the target minimum number of write destages were performed in a time interval or if the target maximum time has elapsed, the scheduling algorithm may assign a higher priority to a write request to be destaged to that logical device.

In stage 420, the number of writes destages performed with respect to logical device 241 is tracked. In stage 430, the number of write destages performed with respect to logical device 241 within a time interval is compared to the target minimum number of write destages. If the number performed within the time interval is less than the target minimum number, method 400 moves to stage 440. Otherwise, method 400 may return to stage 410 or stage 420. In stage 440, the priority of a write request 221-2 is increased so that request 221-2 is performed promptly.

Another way of enforcing a target minimum number of write destages to be performed per unit of time is to periodically force a write destage to be performed if the target minimum is not met. Accordingly, a target maximum time between write destages can be calculated from a target minimum number of write destages to be performed per unit of time. For example, a target of 10 write destages to a device per second is equivalent to a target maximum time of 0.1 seconds between write destages or to one write destage every 100 ms. The target number of 10 write destages per second can therefore be enforced by ensuring a write destage is performed at least once every 100 ms.

In stage 440, disk adaptor 230 increases a priority of write request 221-2 if the target number of write destages is not being met. When the comparison in stage 430 shows that the number of write destages to logical device 241 is less than the target number of write destages, urgency sub-scheduler 314 may increase the priority of write request 221-2 such that write request 221-2 becomes urgent. However, meta-scheduler 312 interprets the priority assigned to destaging write request 221-2 by urgency sub-scheduler 314 in light of priorities assigned by other sub-schedulers or by meta-scheduler 312 in job scheduler 311. Read requests are generally treated as higher priority than write destages and are always considered urgent. Generally, however, when there is no pending urgent request such as a read request, the increased priority of write request 221-2 causes meta-scheduler 312 to destage write request 221-2 promptly. In this case, the data in write request 221-2 is written to the appropriate memory address on logical device 241 and write request 221-2, including the data written to logical device 241, is removed from cache 220.

Under some conditions, it may be desirable to perform a non-urgent request. For example, when the queue of I/O requests in cache is below a user defined threshold and no urgent request exists in the cache, it may be desirable to destage a write request although the write destage has not been given increased priority according to the exemplary algorithm above. For example, write request 221-2 may be destaged even though target number of write destages has already been met.

The second write request to logical device 241 may or may not be the next request received by the disk adapter directed to logical device 241. A separate algorithm, employed by job scheduler 311, determines which write request 221 in cache 220 becomes the second write request 221-2.

In stage 420, disk adapter 230 maintains a counter of the number of write destages associated with the logical device performed since the last write destage to the logical device. The number of writes that have been performed since the last write destage can be compared with the target number of writes per unit time to determine whether the target is being met.

Disk adapter 230 may also maintain a timer for each logical device. When a write destage is performed to the logical device, the timer for that device can be increased by the target maximum time between destages (1/target number of writes). When the timer expires and the target maximum time has elapsed, urgency sub-scheduler 314 may increase the priority of the next write request to that logical device. This timer can be set to current time every time a new target is set. Using the timers for each logical device allows meta-scheduler 312 to order the write destages to different logical devices based on the next time to perform a write and to differentiate between urgent and non-urgent write destages.

Disk adapter 240 may save, in volatile memory 320, performance information regarding the whether the target number of write destages is being met. The stored information could also include which spindle and/or device the write request was directed to and system conditions at the time the write request. This performance information can then be used as feedback to method 400 for adjusting the target number of write destages or identifying a new target number of write destages in stage 410. The information could also be used by other optimization or scheduling algorithms in intermediate portion 202.

Figure 5:
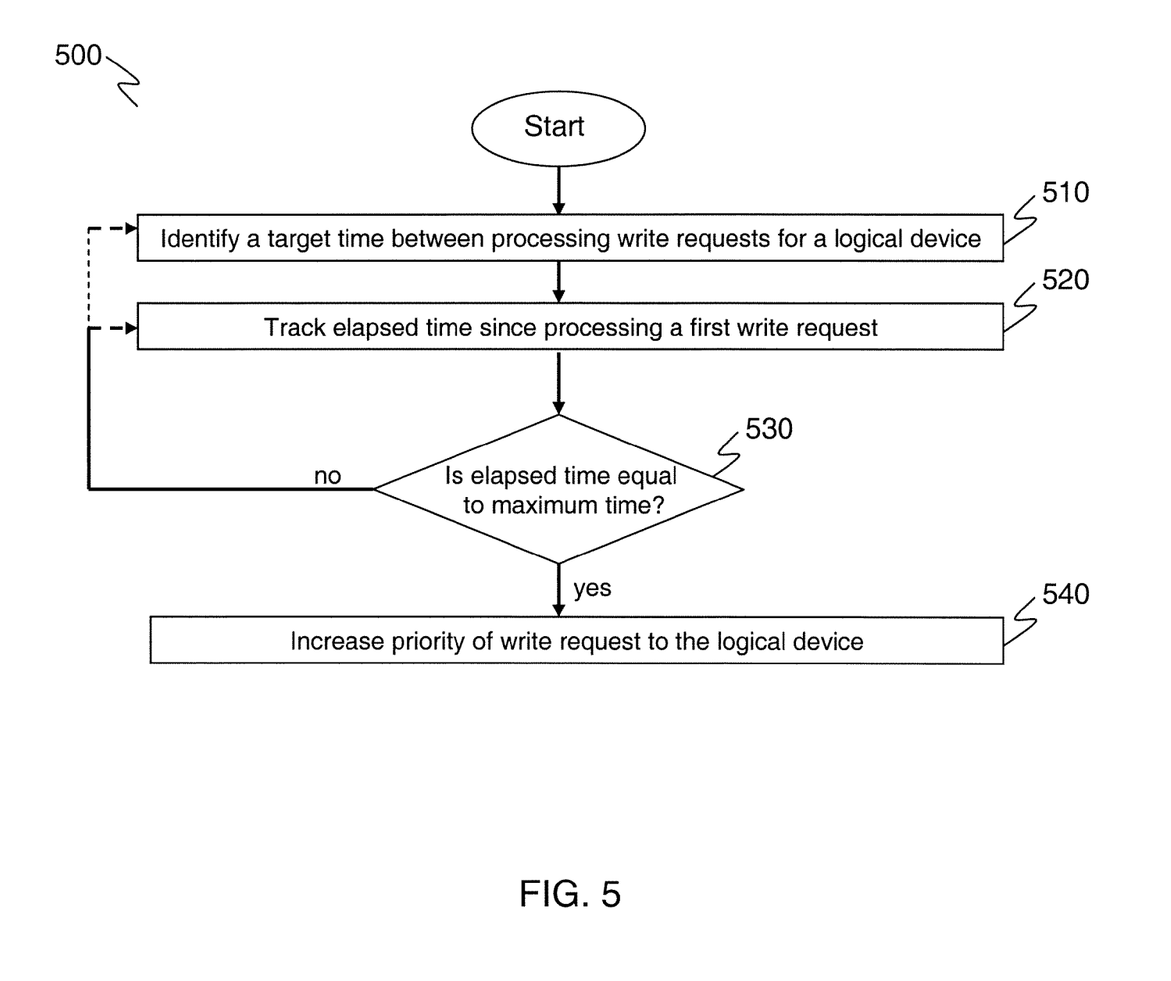
FIG. 5 illustrates an additional exemplary method for scheduling the processing of I/O requests in a cache for a plurality of logical devices associated with the cache.

FIG. 5 illustrates exemplary method 500, which may be implemented similarly to method 400 as described above. In stage 510 of method 500, urgency sub-scheduler 314 identifies a target maximum time between processing, or destaging, a first write request 221-1 and a second write request 221-2 stored in cache 220, where both write requests are directed to logical device 241. This target maximum time may be derived from a target minimum number of write destages per unit time. In stage 520, the elapsed time since processing the first write request 221-1 is tracked. In stage 530, the elapsed time is compared to the target maximum time. If the elapsed time equals the target time, method 500 moves to stage 540. Otherwise, method 500 may return to stage 510 or stage 520. In stage 540, the priority of the second write request 221-2 is increased so that request 221-2 is performed promptly.

Disk adapter 230 may use one or more parameters in parameter store 340 to identify the target number of write destages or the target time. These parameters may include, for example, a maximum system writes pending, a maximum device writes pending, a count of writes pending for the entire cache, and a count of writes pending for the device to be written. Disk adapter 230 may also use a priority associated with the device in determining the target number of writes. This priority may be stored in a lookup table.

In calculating the target minimum number of write destages per unit of time or the target maximum time between write destages, disk adapter 230 may further consider whether the device is the target of a copy, the protection type of the device (i.e. RAID, mirrored, etc.), and the number of DAs that have access to the device. For example, where the logical device is the target of an internal copy operation, the target number of write destages for the logical device may be set the number of read I/O requests to the second logical device from which data is being copied. For another example, since performing a write to a RAID device takes approximately twice as long as performing a write to a mirrored device, the target of the number of writes for a RAID device may be identified as half the target for mirrored device. In another example, where multiple DAs can destage write I/O requests to the same device (such as in a RAID 5 configuration) the target minimum number of write destages may be divided by the number of DAs that can access the device. For example, if the target minimum is 100 I/Os per second for a logical device and four DAs can destage write I/O requests to the logical device, then the target can be adjusted to 25 I/Os per second so that each of the four DAs accesses the logical device equally.

The following example describes one way that disk adapter 230 may calculate a target number of write destages using above-mentioned parameters. First, disk adapter 230 calculates a "device write pending level" based on the relationship between the maximum number of writes pending on logical device 241 and the number of writes pending on logical device 241.

$$\text{device write pending level} = (\text{number of writes pending on device/maximum writes pending on device}) *100 \quad \text{(Eq. 1)}$$

For example, using Equation 1, disk adapter 230 will calculate the device write pending level is 50 where the number of writes pending on logical device 241 is half of the maximum writes that may be pending on logical device 241. A similar write pending level calculation may be performed with respect to the cache for the entire system:

$$\text{system write pending level} = (\text{number of writes pending on the system/maximum writes pending on the system}) *100 \quad \text{(Eq. 2)}$$

For example, using Equation 2, disk adapter 230 will calculate the system write pending level is 80 where the number of writes pending on cache 220 is 80% of the maximum writes that may be pending on cache 220. Disk adapter 230 may access parameter store 340 to identify the number of writes pending in cache 220 and the number of writes pending with respect to the logical device.

An adjustment can be made to the number of writes pending used in the calculation based on the device type. For example, where the device is a RAID device and one disk adapter is used to start the writes on RAID devices, no adjustment must be made to the number of writes pending. However, where multiple DA's can start writes to RAID devices, the number of writes pending could be adjusted so that each of the DAs will access the logical device equally by multiplying the number of writes pending by the number of DAs that have access to the logical device.

In calculating the target number of write destages for a logical device in a data storage system where the cache has been partitioned, disk adapter 230 may consider each of the partition of cache as an independent cache system in equations 1 and 2. Disk adapter 230 may then adjust the target number of write destages for each logical device based on the maximum that entire partitioned cache can perform on all the partitions together similar to the adjustment that may be made for the maximum for each spindle.

Next, using the maximum value between the device write pending level and the system write pending level, disk adapter 230 then calculates the write priority.

$$\text{Write priority} = \text{max write pending level/max write pending constant} \quad \text{(Eq. 3)}$$

For example, where the system write pending level is 24 (calculated, for example, by Eq. 1) and the device write pending level is 50 (calculated, for example, by Eq. 2), the maximum is 50 and the write priority, using Equation 3 is 0.0714. The max write pending constant is a constant, such as 7. The constant may be selected from a range, such as 1 and 14, based on experimentation and consideration of system performance results. Alternatively, a lookup table, such as the exemplary priority lookup table 351 could also be used to determine the write priority and may be created using experimental performance results. For example, priority lookup table 351 of FIG. 6 indicates that a write priority level of 9 corresponds to the write pending level 50.

Using the write priority, disk adapter 230 then calculates the "time to destage," which is the time to destage all of the urgent write destages from cache 200.

$$\text{Time to destage} = \text{write pending level variable} - \text{Write priority} \quad (\text{Eq. 4})$$

For example, where the write priority is 0.0714 (calculated, for example, by Eq. 3), the time to destage is then 12.85 seconds using equation 4 where the write pending level variable is 20 seconds. The write pending level variable is a constant selected based on experimentation and consideration of system performance results. For example, one consideration in choosing a write pending level variable may be the possibility of write request 221-2 being a re-write to the same location on a logical device. Destaging write requests too quickly would waste system resources where the host continues to overwrite data quickly. In this exemplary embodiment, the default write pending level variable is set to 20 seconds and could be in the range of 4 seconds to 20 seconds depending on how many write destages are pending on the system. For example, a write pending level variable of four seconds corresponds to a high write pending level and a variable of twenty seconds corresponds to a low write pending level. Other ranges may be appropriate for varied systems and system conditions.

Next, disk adapter 230 identifies a target minimum number of write destages associated with the logical device to be performed per unit time ("device target") based on the time to destage calculated in Equation 4:

$$\text{device target} = \text{Number of writes pending on the device}/\text{Time to destage} \quad (\text{Eq. 5})$$

For example, where the number of writes pending on logical device 241 is 75,000 and the time to destage is 12.85 seconds (calculated, for example, by Eq. 4), the device target minimum is 5,837 write I/O destages per second using Equation 5.

After calculating the device target for all logical devices that share the spindle, a further adjustment to the device targets may be necessary to ensure that the total target minimum number of writes associated with a spindle to be performed per unit of time will never exceed the maximum number of writes that the spindle can perform. To ensure the spindle performance capacity is not exceeded, disk adapter 230 may sum the device targets for each logical device sharing the spindle. If the sum for the spindle exceeds the spindle performance capacity, disk adapter 230 may adjust the device targets by multiplying each by the ratio of the total target number of writes targeted associated with the spindle to be performed to the number of writes pending on the logical device.

Disk adapter 230 may calculate a maximum target time ("T") between destaging writes for the logical device using the device target calculated with equation 5. The maximum target time between destaging writes can be calculated from the target minimum number of write destages associated with the logical device to be performed per unit time calculated in Equation 5. As a way to enforce the target minimum number of writes, disk adapter 230 would have to perform the Nth 10 after T*N seconds.

To quickly adjust itself to a new workload, disk adapter 230 may, additionally or alternatively, consider changes in the number of writes pending to the device over time and the average queue length on the hard drives. For example, disk adapter 230 may use the exemplary calculation in equations 1 through 5 once every 10 seconds but do an adjustment based on the actual phase of changes in the level of write pending on each device once every one second.

Where there are, on average, few write requests in the queue on the spindle (a short queue depth) and there is an increase in the level of writes pending to the logical device, the target number of write destages to a device should be increased so that more writes are performed. Similarly, where there is a decrease in the number of writes pending to the logical device and there is a large queue depth, the target number of write destages to the logical device can be decreased so that less writes are performed. If using a target maximum time to enforce the target number of writes, then the target maximum time between destaging writes to the logical device can be reduced so that more writes are performed or the target time between destaging writes to the logical device can be increased so that less writes are performed.

Figure 7:
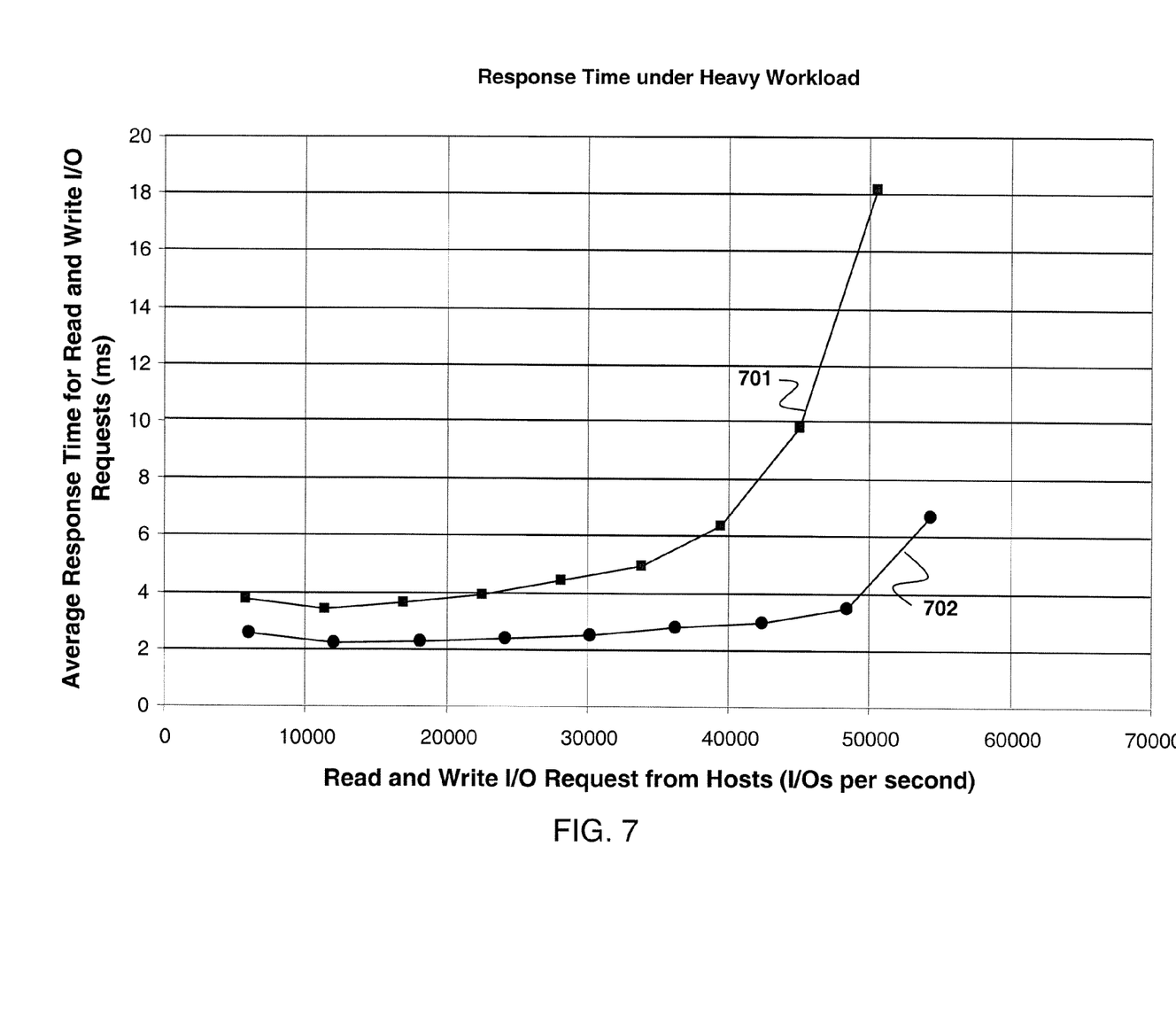
FIG. 7 illustrates exemplary performance data for a system implementing the method from FIG. 5 compared to an alternative method when the system is under heavy workload.
Figure 8:
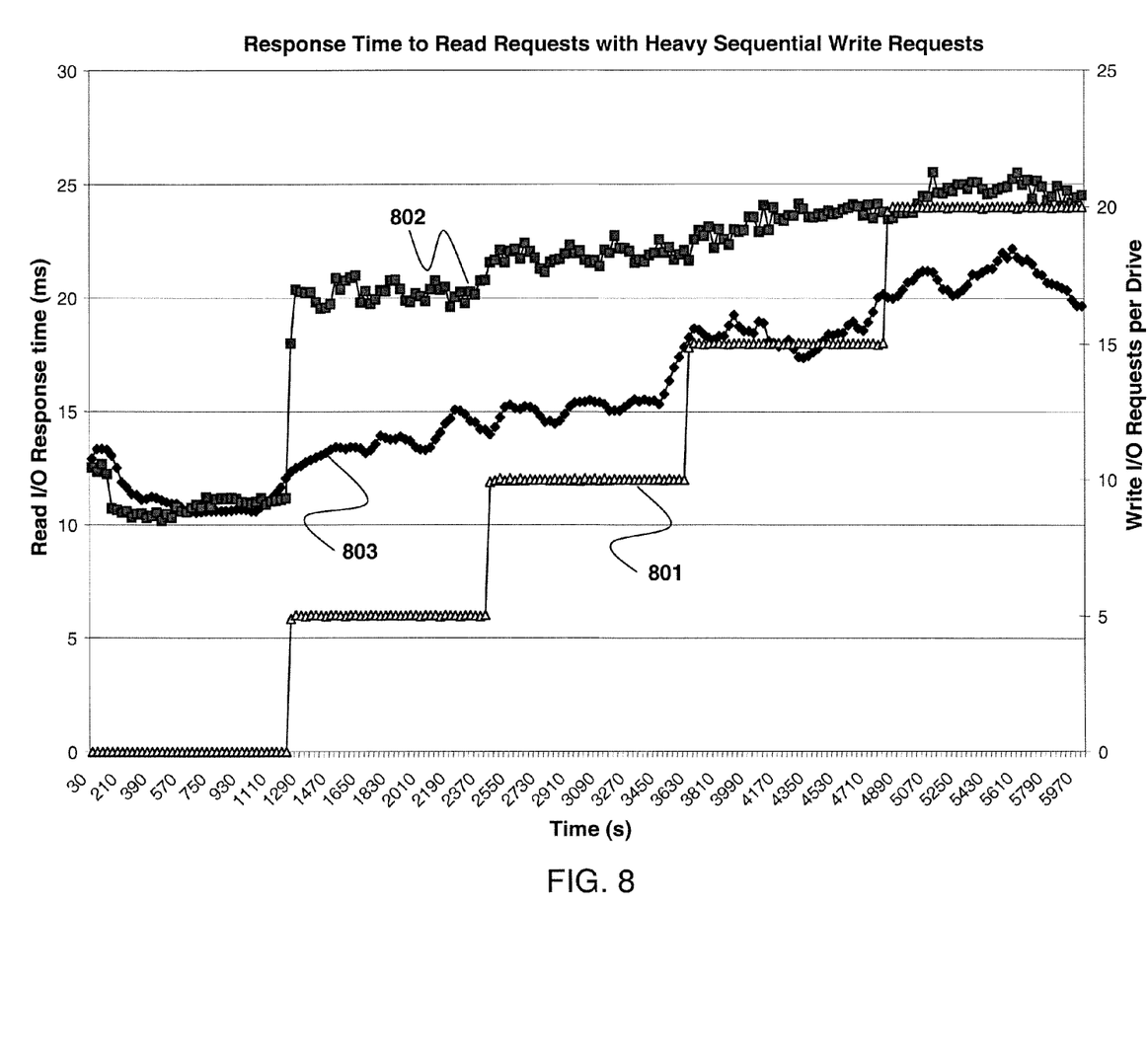
FIG. 8 illustrates exemplary performance data for a system implementing the method from FIG. 5 compared to an alternative method when there is a large number of sequential writes being performed by the system.

FIG. 7 and FIG. 8 illustrate an exemplary comparison of performance data for a SYMMETRIX DMX4500 data storage system with and without a method consistent with the present invention incorporated therein. In the exemplary test whose results are illustrated in FIG. 7 and FIG. 8, the SYMMETRIX DMX4500 data storage system featured 32 processors, 8 disk adaptors, 960 RAID 5 configured disk drives, and 3360 logical devices.

FIG. 7 compares average response times for host read and write I/O requests that was measured for the system with and without a method consistent with the present invention incorporated therein at various simulated I/O load rates. This figure shows the performance of a data storage system employing a prior art scheduling algorithm compared to the performance of the same system incorporating a method consistent with the present invention. The simulated workload used in generating the performance data shown in FIG. 7 contains various types of I/O requests including read requests and sequential and other write requests. The simulated I/O loads may be considered heavy in sequential write requests. The horizontal axis represents the number of read and write I/Os requests per second from hosts using the system. The vertical axis represents an average response time of the data storage system in milliseconds for all I/O requests from the hosts. Curve 701 illustrates the measured average response time of the system implementing a prior art scheduling algorithm. Curve 702 illustrates the measured average response time of the system further implementing a method consistent with the present invention.

FIG. 8 compares average response times for host read I/O requests that was measured for the system with and without a method consistent with the present invention incorporated therein at various simulated I/O load rates. The horizontal axis designates a range of time in seconds. The right-hand vertical axis designates a range of write I/O requests per drive per second. Line 801 illustrates the number of write I/O requests initiated per drive each second during the experiment. The left-hand vertical axis designates a range of average response times in milliseconds for all read I/O requests from the hosts. During the experiment, the number of read I/O requests was fixed to 15 read I/O requests per second. Line 802 illustrates the measured average read response time of the system implementing a prior art scheduling algorithm. Line 803 illustrates the measured average read response time of the system further implementing a method consistent with the present invention.

One of ordinary skill in the art will also appreciate that features and principles of the present invention may be implemented in different elements of a data storage system. Similarly, one of ordinary skill in the art will also appreciate that computer readable program code to implement a method consistent with features and principles of the present invention may be stored on various media, including various persistent memory devices.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for scheduling the processing of I/O requests in a cache for a plurality of logical devices associated with the cache, the method comprising:
    identifying a target minimum number of write destages to be performed with respect to a first logical device in the plurality of logical devices within a unit of time; and
    enforcing the target minimum number of write destages to be performed with respect to the first logical device.

2. The method of claim 1 wherein enforcing the target minimum number of write destages to be performed with respect to the first logical device further comprises:
    identifying a first target time between processing a first write request in the cache associated with a first logical device in the plurality of logical devices and processing a second write request in the cache associated with the first logical device, wherein the first target time is the unit of time divided by the target minimum number of write destages to be performed with respect to the first logical device within the unit of time;
    tracking an elapsed time since processing the first write request, wherein processing the first write request comprises writing data to the first logical device;
    comparing the elapsed time to the first target time; and
    increasing a priority associated with the second write request when the elapsed time is equal to the first target time, wherein the increased priority causes the second write request to be processed promptly.

3. The method of claim 1 wherein enforcing the target minimum number of write destages to be performed with respect to the first logical device further comprises:
    tracking a number of write destages performed with respect to the first logical device within the unit of time;
    comparing the number of write destages performed within the unit of time to the target minimum number; and
    increasing a priority associated with a write destage to be performed with respect to the first logical device when the number of write destages performed within the unit of time is less than the target minimum per unit time.

4. The method of claim 3 further comprising periodically comparing the number of write destages performed within the unit of time to the target minimum number.

5. The method of claim 1 further comprising periodically identifying a target minimum number of write destages to be performed with respect to a first logical device in the plurality of logical devices within a unit of time.

6. The method of claim 1 wherein the unit of time is a second.

7. A method for scheduling the processing of I/O requests in a cache for a plurality of logical devices associated with the cache, the method comprising:
    identifying a first target time between processing a first write request in the cache associated with a first logical device in the plurality of logical devices and processing a second write request in the cache associated with the first logical device;
    tracking an elapsed time since processing the first write request, wherein processing the first write request comprises writing data to the first logical device;
    comparing the elapsed time to the first target time; and
    increasing a priority associated with the second write request when the elapsed time is equal to the first target time, wherein the increased priority causes the second write request to be processed promptly.

8. The method of claim 7 wherein the second write request is not processed when the elapsed time is less than the first target time.

9. The method of claim 7 wherein the first target time is identified periodically.

10. The method of claim 9 further comprising saving data related to the comparison of the elapsed time to the first target time.

11. The method of claim 10 wherein identifying a first target time is based on at least one parameter chosen from the list consisting of a change in the write pending count for the cache associated with the first logical device over a time interval, the data related to the comparison of the elapsed time to the target time, and an average queue length of writes pending for a plurality of logical devices including the first logical device wherein the plurality of logical devices comprise a single physical memory device.

12. The method of claim 11 wherein the cache is divided into a plurality of partitions and identifying a first target time is based on at least one parameter chosen from the list consisting of a write pending count for one of the plurality of partitions of the cache associated with the first logical device, a write pending count for the first logical device, a maximum write pending count for one of the plurality of partitions of the cache associated with the first logical device, and a maximum write pending count for the first logical device.

13. The method of claim 7 wherein identifying a first target time is based on at least one parameter chosen from the list consisting of a write pending count for the cache associated with the first logical device, a write pending count for the first logical device, a maximum write pending count for the cache associated with the first logical device, and a maximum write pending count for the first logical device.

14. The method of claim 13 further comprising saving data related to the comparison of the elapsed time to the target time, and wherein identifying a first target time is based on at least one parameter chosen from the list consisting of a change in the write pending count for the cache associated with the first logical device over a time interval, the data related to the comparison of the elapsed time to the target time, and an average queue length of writes pending for a plurality of logical devices including the first logical device wherein the plurality of logical devices comprise a single physical memory device.

15. The method of claim 7 wherein the cache is divided into a plurality of partitions, and further comprising identifying a second target time for one of the plurality of partitions associated with the first logical device; comparing the first target time with the second target time; and when the first target time is equal to the second target time, setting the first target time equal to the second target time.

16. A method for scheduling the processing of I/O requests in a cache for a plurality of logical devices associated with the cache, the method comprising:

identifying a target minimum number of write destages to be performed with respect to a first logical device in the plurality of logical devices within a unit time;

tracking a number of write destages performed with respect to the first logical device within the unit of time;

comparing the number of write destages performed within the unit of time to the target minimum number; and increasing a priority associated with a write destage to be performed with respect to the first logical device when the number of write destages performed within the unit of time is less than the target minimum per unit time.

17. The method of claim 16 further comprising saving data related to the comparison of the number of write destages performed within the unit of time to the target minimum number to be performed within the unit time.

18. The method of claim 17 wherein the target minimum number of write destages is identified with a function that includes at least one parameter chosen from the list consisting of a change in the write pending count for the cache associated with the first logical device over a time interval, the data related to the comparison of the elapsed time to the target time, and an average queue length of writes pending for a plurality of logical devices including the first logical device wherein the plurality of logical devices comprise a single physical memory device.

19. The method of claim 16 wherein the target minimum number of write destages is identified with a function that includes at least one parameter chosen from the list consisting of a write pending count for the cache associated with the first logical device, a write pending count for the first logical device, a maximum write pending count for the cache associated with the first logical device, and a maximum write pending count for the first logical device.

20. The method of claim 16 wherein the priority associated with a write destage to be performed with respect to the first logical device is not increased if the number of write destages performed within the unit of time is greater than the target minimum number per the unit of time.

* * * * *